（12）United States Patent
Shoopman

(10) Patent No.: US 11,173,822 B2
(45) Date of Patent: Nov. 16, 2021

(54) SAFETY LATCH FOR A DUMP BODY

(71) Applicant: Jeffery Blair Shoopman, Saginaw, MI (US)

(72) Inventor: Jeffery Blair Shoopman, Saginaw, MI (US)

(73) Assignee: Ideal Latch Systems, L.L.C., Reese, MI (US)

( * ) Notice: Subject to any disclaimer, the term of this patent is extended or adjusted under 35 U.S.C. 154(b) by 273 days.

(21) Appl. No.: 16/501,562

(22) Filed: Apr. 29, 2019

(65) Prior Publication Data

US 2019/0301210 A1    Oct. 3, 2019

(51) Int. Cl.
B60P 1/273    (2006.01)

(52) U.S. Cl.
CPC .................... B60P 1/273 (2013.01)

(58) Field of Classification Search
CPC .... B60P 1/273; B60P 1/26; B60P 1/28; B60P 1/283; E05C 1/004; E05B 81/10; E05B 3/02; E05B 81/18; E05B 41/00; B62D 33/037
USPC ......... 298/23 M, 23 S, 23 A, 23 B, 23 D, 38
See application file for complete search history.

(56) References Cited

U.S. PATENT DOCUMENTS

| | | |
|---|---|---|
| 1,586,808 A | 6/1926 | Hug |
| 2,210,286 A | 8/1940 | Fitch |
| 2,675,268 A | 4/1954 | Hutchinson |
| 3,325,216 A | 6/1967 | Boeck |
| 3,383,137 A * | 5/1968 | Smith ...................... B60P 1/273 298/23 A |
| 4,032,192 A | 6/1977 | Jensen |
| 4,084,852 A * | 4/1978 | Prosek ...................... B60P 1/16 298/38 |
| 4,691,956 A | 9/1987 | Hodge |
| 5,413,402 A | 5/1995 | Flerchinger et al. |
| 5,603,536 A * | 2/1997 | Bauer ...................... E05B 51/02 292/144 |
| 6,135,565 A | 10/2000 | Bachelor |
| 6,382,731 B1 | 5/2002 | Slutz et al. |
| 6,698,842 B1 * | 3/2004 | Cornell ................... B60P 1/267 298/23 M |
| 6,764,130 B1 | 7/2004 | Hull |

(Continued)

OTHER PUBLICATIONS

Wastequip, LLC, "Environmental Intermodal Containers," 2019, printed Mar. 12, 2019.

(Continued)

*Primary Examiner* — Stephen T Gordon
(74) *Attorney, Agent, or Firm* — Christopher John Rudy

(57) ABSTRACT

Safety latch includes an active member having a support; a thrust pin actuator with a movable thrust pin actuator element movable to and fro along an axis; a thrust pin having a proximate end attachable to the movable thrust pin actuator element such that the thrust pin can be moved to and fro along the axis with movement of the movable thrust pin actuator element, and a distal end; and a biasing element to bias the thrust pin in an extended position. Passive member includes a catch with a thrust pin receiving hole. When assembled, and the movable thrust pin actuator element is slid to and fro, at least the distal end of the thrust pin can penetrate into or be withdrawn from the thrust pin receiving hole to close or open the safety latch. It can be attached to a dump body, say, as part of a dump vehicle.

22 Claims, 6 Drawing Sheets

(56) References Cited

U.S. PATENT DOCUMENTS

| | | |
|---|---|---|
| 8,944,484 B2 | 2/2015 | Kibler et al. |
| 9,039,097 B2 | 5/2015 | Petzitillo, Jr. et al. |
| 10,266,092 B2 | 4/2019 | Gardner |

OTHER PUBLICATIONS

B&D Truck Parts, "Truck-Lite Compression Fitting ¾", 6&7-Way Cable 50842," printed Mar. 12, 2019.
More Videos, 0:00/0:49 Still Frame of known lead and pup (trailing) dump trailers, printed ca. Mar. 12, 2019.

* cited by examiner

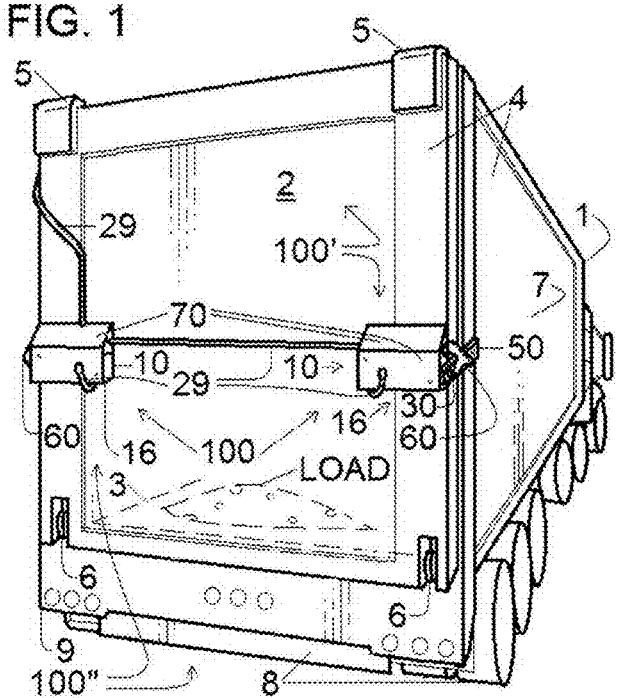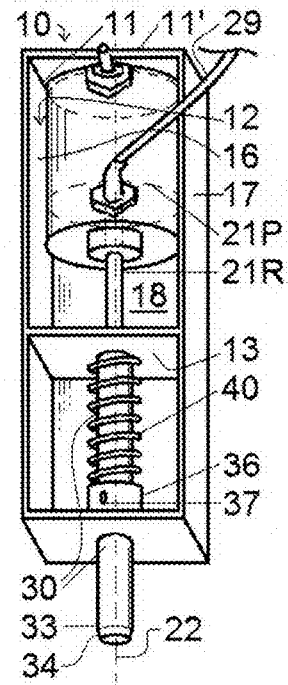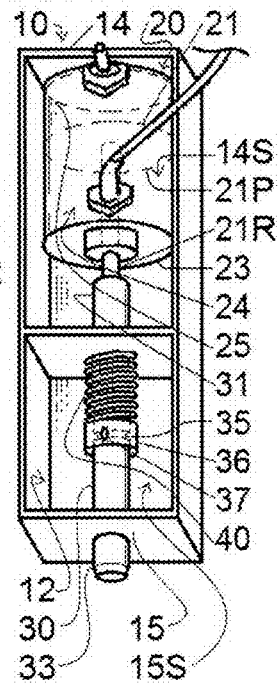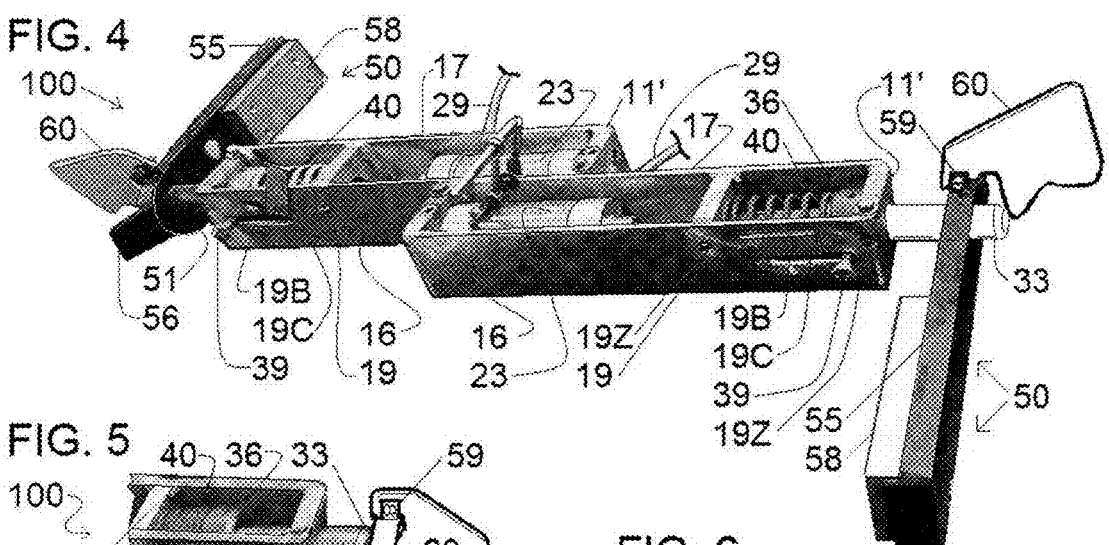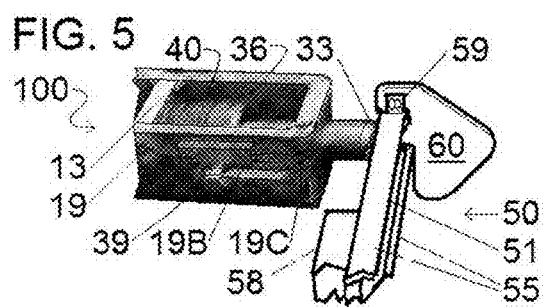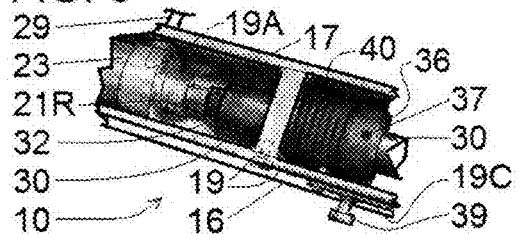

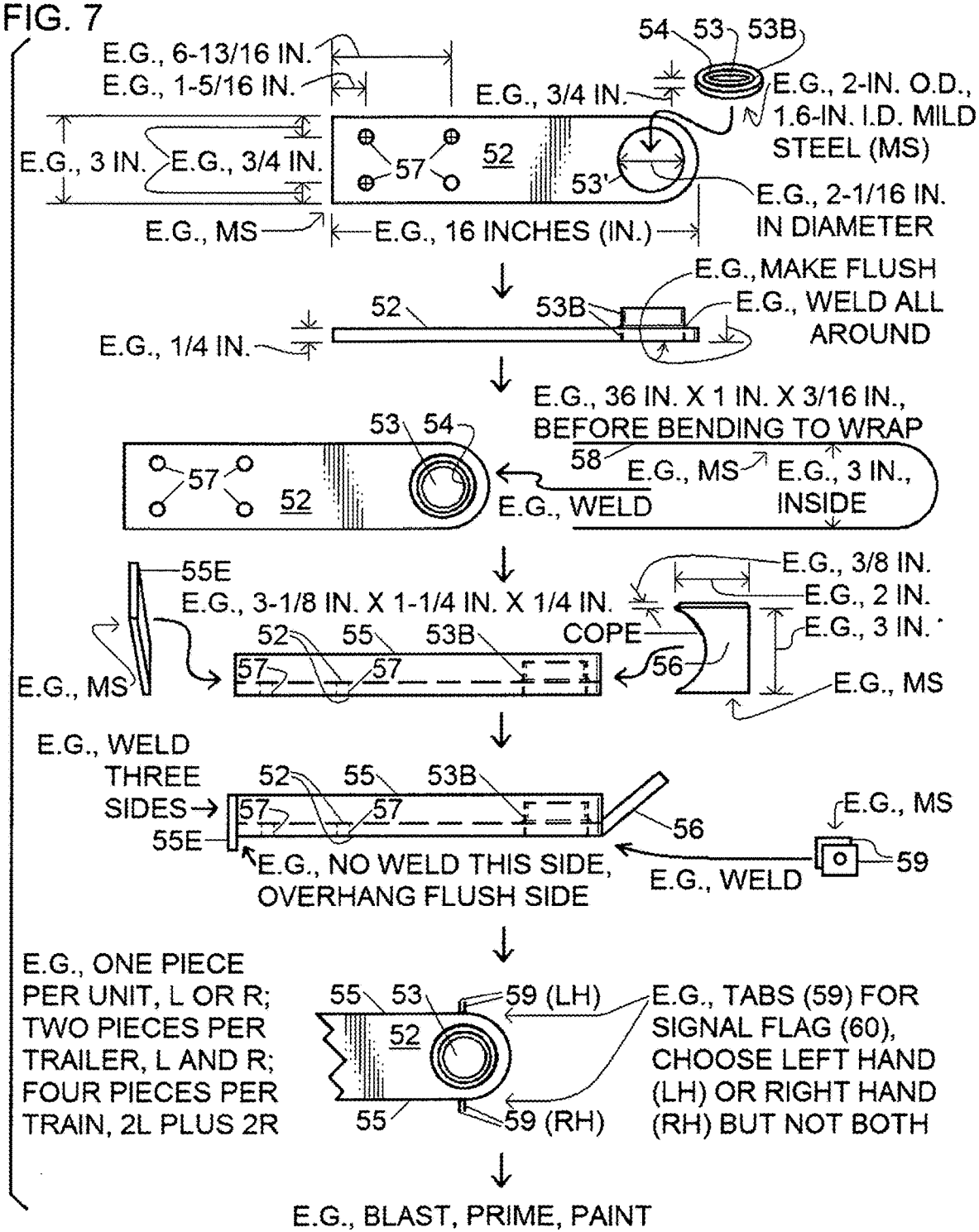

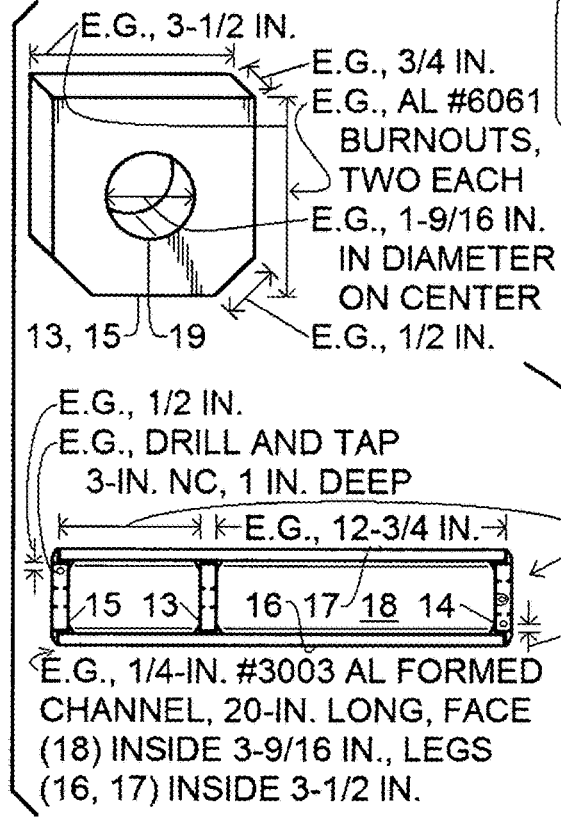
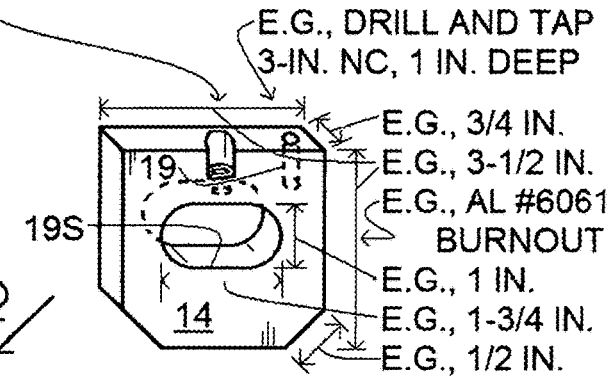
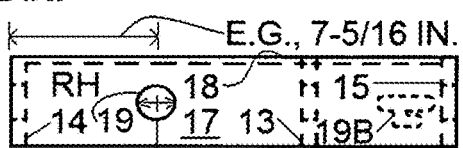
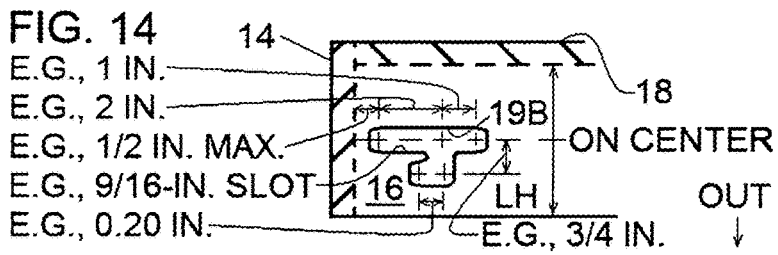
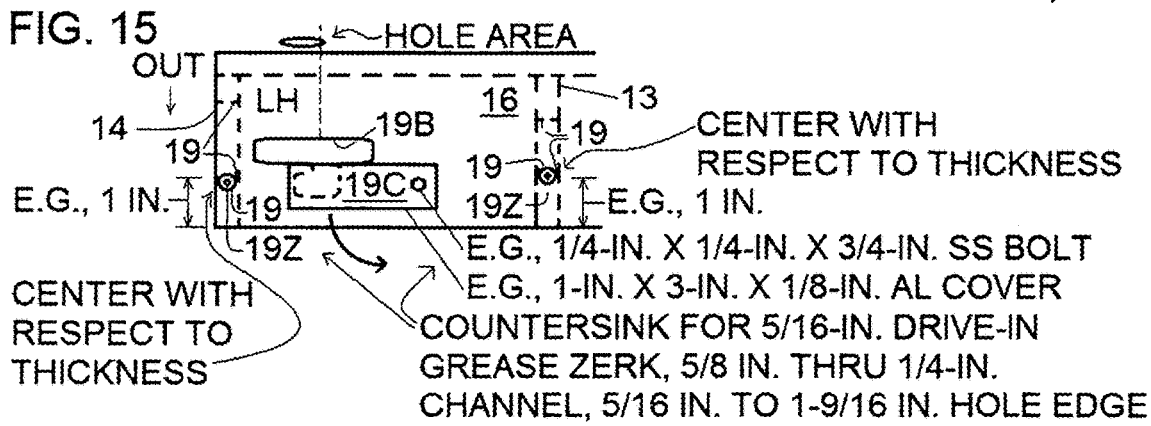

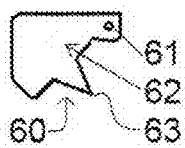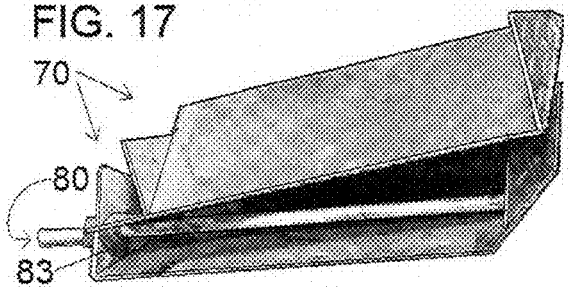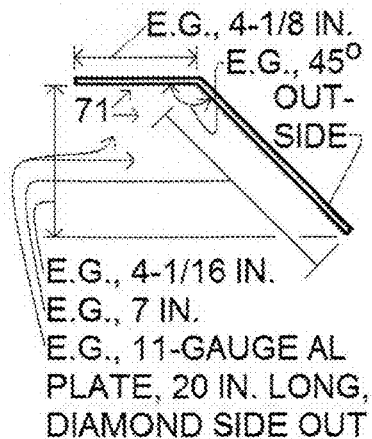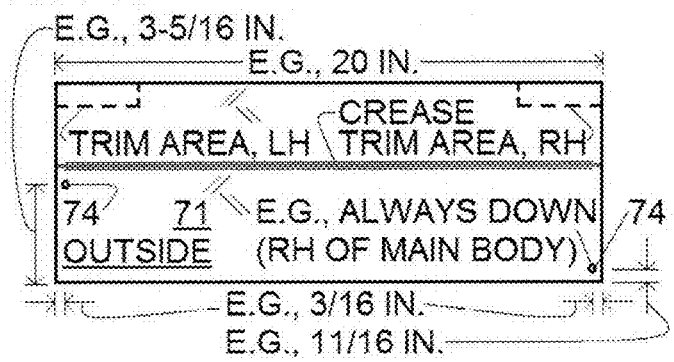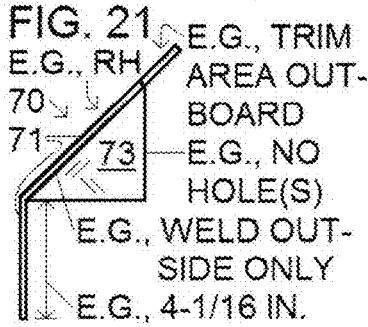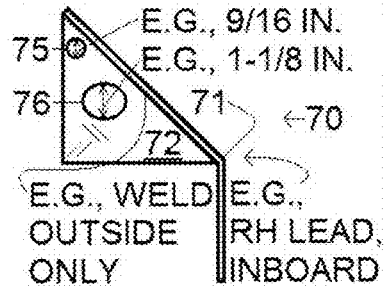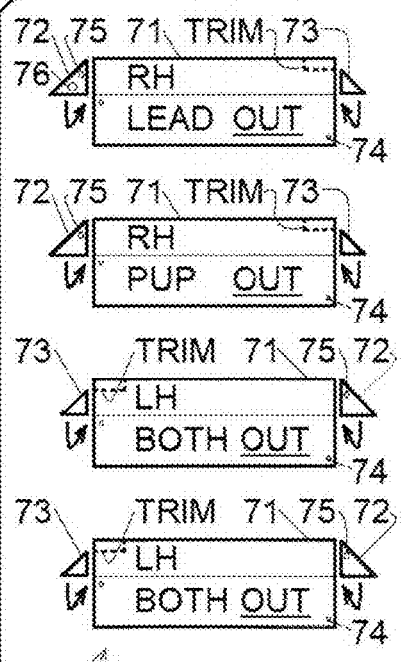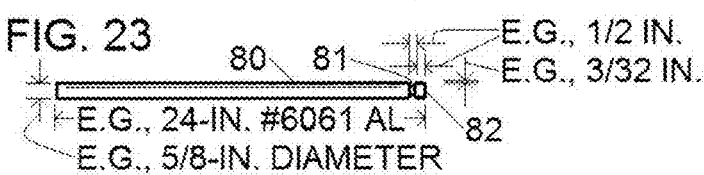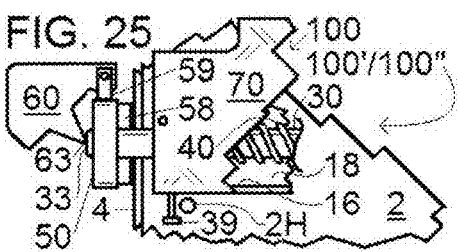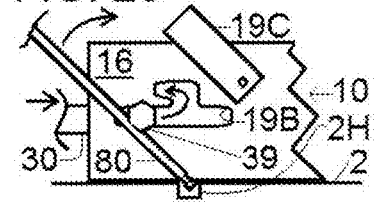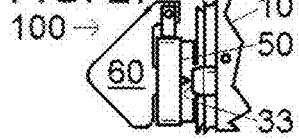

SAFETY LATCH FOR A DUMP BODY

FIELD AND PURVIEW OF THE INVENTION

This concerns a safety latch for a dump body having a dump gate; a dump body having the dump gate and the safety latch; and a dump vehicle including the dump body having the dump gate and the safety latch. The safety latch can be fluid-operated. The fluid may be a gas, for example, air, and the dump vehicle may be a dump trailer, for example, an end dump trailer.

BACKGROUND TO THE INVENTION

Dump vehicles such as motorized dump trucks and non-motorized, hauled dump trailers come in various forms. They typically include a dump body for containing a load—for example, a solid sample in discrete pieces or a particulate such as soil, gravel, or construction waste, or foodstuffs such as grain, fruit or vegetables, say, sugar beets, and so forth—and a dump body supporting member, which would include a frame, wheels, and so forth. The dump body of concern includes, in addition to bottom structure for supporting and containing thereabove the load, vertical structure for restraining and containing the load laterally. Part of that vertical structure is a dump gate, which opens and closes in a pivoting motion, typically with a pivot at the top of the gate. The dump gate must be secured in its closed position for transport of the load, and released to open it to dump the load.

As in the case of an end dump trailer, the dump gate pivots at its top and is secured in the closed position by primary latches, usually a pair of dog or hook type latches positioned to grasp a pin or other protuberance near the lowermost portion on opposite sides of the dump gate, here, a tailgate, and draw the tailgate into contact with adjacent side panel vertical structure to close the dump body. Current practice requires safety latches in addition to and above the primary latches. Industry wide, these are manually operated wing-lock, also known as turnbuckle, safety latches. The safety latches function to keep the tailgate closed, not relying on the primary latches alone, and better keep the contents of the dump trailer from unintentionally spilling, noting that spills on roadways, in addition to engendering loss of part of or the entire load, can result in fines and possible injury to motorists and damage to their vehicles. The use of the safety latches also prevents excessive wear on the primary latches.

Although typically the primary latches are pneumatically operated, a designated operator, typically the driver, must physically, manually operate the wing-lock or turnbuckle safety latches. This is to be done under all conditions, including in heat or cold; in wind, rain, sleet or snow; with snow, ice, mud or debris on the ground; and whether the driver feels up to it or not.

Drivers fail in this duty, however, at times not utilizing some or all of the wing-lock or turnbuckle safety latches. Not using safety latches can quickly draw the attention of authorities, who are rightfully on the lookout for such violations. Moreover, some drivers use only the driver's side wing-locks in order to partially comply with laws or regulations, and to avoid circling the entire trailer during each dump cycle. If that happens, with only one wing-lock engaged or with the one that is not latched falling into a partially latched position, when dumping, the tailgate is held on one side and opens first on the free side, which causes twisting of the gate and destruction of the wing-lock and other components. In addition, damage to equipment can result when drivers do not get to the turnbuckle safety latches in time to release them before a load is dumped, in which case the tailgate can burst open as material piles up against it as the dump body is tilted, thus destroying tailgates, hinges, and turnbuckles.

The following references, which are incorporated herein by reference, may be of interest:

U.S. Pat. No. 1,586,808 to Hug. This discloses a dumping truck, which has a simple latch system to release a bottom opening tailgate. It has a complicated dumping mechanism, with an automatic tailgate opener. No secondary safety latch is present.

U.S. Pat. No. 2,210,286 to Fitch. This discloses an end gate latch, which has a pair of horizontally moveable, manual latches to secure a bottom opening end gate. It has a fixed rear wall, with a gate added as a grain door. Its manual open-close operation requires being in close proximity to a rapidly moving gate, and there is pressure from the contents. No secondary safety latch is present.

U.S. Pat. No. 2,675,268 to Hutchinson. This discloses endgate control for truck bodies, which has a simple moveable hook to hold a bottom opening tailgate closed. It has manual, cab-operated factory bottom latches, which, from the link rods 32 rearward, generally are the same as those used in current systems. No secondary safety latch is present.

U.S. Pat. No. 3,325,216 to Boeck. This discloses automatic tail gates for dump trucks and the like, which has fluid-pressure piston and cylinder actuated movement of a gate and bottom and side latches. It has hydraulically operated unlatching and lift of its tailgate, with the first 2-3 inches of cylinder extension unlatching four latch mechanisms. Two upper points act as secondary safety latches (wing-locks). It does not require the driver to leave the cab of the truck.

U.S. Pat. No. 4,032,192 to Jensen. This discloses a latching mechanism for a rear gate of a dump vehicle with an automatic tilt release, which has a pair of moveable side catches that engage a horizontal rod positioned mid-way between the top and bottom of a bottom opening rear gate. It opens the tailgate with box tilt (lift) and replaces factory latches at the bottom of the gate. No secondary safety latch is present.

U.S. Pat. No. 4,691,956 to Hodge. This discloses a counterbalanced tailgate for dump boxes, which has a spring-containing lower horizontally moveable lower locking pin for a bottom opening tailgate. It represents a way of turning a latch into a hinge for a two-way gate. No secondary safety latch is present.

U.S. Pat. No. 5,413,402 to Flerchinger et al. This discloses a sequenced tailgate lock, which includes two or more fluid-operated piston and cylinder locking assemblies, one of more of which is visible to an operator. Actuation is sequenced. It represents hydraulic replacement of factory latches, with packer boxes requiring strong hinges and locks, and has all cab operation.

U.S. Pat. No. 6,135,565 to Bachelor. This discloses a rotary tailgate latch operating system, which has lower horizontally moveable lower locking pins for a bottom opening tailgate. It represents employment of rotary action for activating factory latches. No secondary safety latch is present.

U.S. Pat. No. 6,382,731 B1 to Slutz et al. This discloses a load hauling vehicle with sidewall raising and lowering mechanism, which can be dumped to the rear or side. It pertains to side loader function, with tailgate latch 38 and latch 42 known factory latches. No secondary safety latch is present.

U.S. Pat. No. 6,764,130 B1 to Hull. This discloses a multi-position tailgate for dump trailers, which has top or bottom pivoting opening capability through horizontally extending pins engaged by side latches. It represents an all-manual three-way tailgate.

U.S. Pat. No. 8,944,484 B2 to Kibler et al. This discloses a pressurized locking assembly for a side-swing tailgate and a tailgate incorporating the same, which includes a manual safety latch of the turnbuckle variety. It represents a two-way tailgate with its safety latch 112 an original wing-lock style secondary safety latch. A pneumatic or hydraulic cylinder 82 operates a top hinge/latch of its locking assembly 35 for barn door operation.

U.S. Pat. No. 9,039,097 B2 to Petzitillo, Jr. et al. This discloses an apparatus and method for remotely locking a container, which is adapted for transport on one or more vehicles such as an intermodal container, which includes bottom and mid-level side pins horizontally extending to be engaged by moving hydraulically actuated hook latches. Watertight intermodal containers require more point of closure to assure a strong door seal. The container doors must be operable in any position, on a truck, on the ground, and so forth. Actuation is hydraulic.

U.S. Pat. No. 10,266,092 B2 to Gardner. This discloses a low center of gravity dump trailer with a hydraulically latched cover. It has manual rear lower primary closure and mid-level safety latches for a bottom-opening rear gate. It pertains to top cover open-close operation, with original wing-lock style secondary safety latches employed on its tailgate (FIG. 3).

It would be desirable to ameliorate if not overcome at least one of the drawbacks and problems in the art, to include as aforesaid, particularly as concerns the known safety latches and their operation. It would be desirable to provide the art an alternative, particularly for use with dump vehicles, especially hauled dump trailers, most especially end dump trailers.

A FULL DISCLOSURE OF THE INVENTION

Provided hereby is a safety latch for a dump body, in assembled or in kit form, which comprises the following (A, B):
- (A) an active member, which includes a support, and the following (A', B', C'):
  - (A') a thrust pin actuator, which has a movable thrust pin actuator element that is able to be moved to and fro along an axis in which motion can ensue through non-manually applied force;
  - (B') a thrust pin having proximate and distal ends, with the proximate end attachable to the movable thrust pin actuator element such that the thrust pin is able to be moved to and fro along the axis with movement of the movable thrust pin actuator element; and
  - (C') a biasing element to bias the thrust pin in an extended position; and
- (B) a passive member, which includes a catch having a thrust pin receiving hole such that—when the active member is assembled, and the movable thrust pin actuator element is slid to and fro—at least the distal end of the thrust pin can penetrate into or be withdrawn from the thrust pin receiving hole so as to close or open the safety latch.

The present safety latch can be attached to a dump body having a dump gate to provide a dump body, safety latch combination, which comprises the dump body, which has a bottom structure for supporting and containing a load above it; and vertical structure for restraining and containing the load laterally, a first portion of which includes, as the dump gate, an openable and closable dump gate pivotable about a pivot and securable in a closed position by at least one primary latch spaced apart from the pivot, and a second portion of which is able to be rendered stationary with respect to dump gate; and the safety latch attached to the dump body, with at least one active member assembled and attached to openable and closable dump gate, and, for each active member, the passive member attached to the portion of the vertical structure rendered stationary with respect to the dump gate. The present dump body, safety latch combination can be attached to a dump body supporting member, which would include a frame, wheels, and so forth, to provide a dump vehicle, safety latch combination.

The invention is useful in goods transport.

By the invention, the art is advanced in kind, and at least one of the problems in the art is ameliorated if not solved. The art is provided an alternative, particularly for use with dump vehicles, especially hauled dump trailers, most especially end dump trailers. More particularly, a one-step dumping procedure is provided, eliminating the need for the driver to be in the area of a dumping trailer, especially in the rear with end dump trailers. Thus, driver safety and efficiency are increased dramatically, and the chance of damage to equipment is minimized. The safety latch can be fluid-operated. With air as an exemplary fluid, and an end dump trailer as an exemplary dump vehicle, the air-operated safety latches can operate simultaneously, using a factory switch setup with the primary tailgate latches, which are found at the bottom of nearly all end dump trailers. A delay system can be employed to release the air-operated safety latches first, and then to release the primary latches to operate (open), thus allowing the contents of the trailer (load) to be dumped with the driver safely away from danger. Thus, for example, air-operated safety latches operate without additional manual controls installed; the existing tailgate release switch is flipped, releasing the safety latches, which can operate at a first value, say, an approximately 40-psi value, owing to the biasing element, say, compression springs; pressure in the system must reach a second value higher than the first value, say, an approximately 70-psi value, before the primary gate latches release; this provides a reserve to be attained, say, an extra 30-psi or so reserve, for releasing the safety latches in case the driver encounters a situation that would require delay or cancelation of dumping of the load or for any other reason. The air-operated safety latches can be provided with a visual signal, for example, high visibility flags such as of metal or engineering plastic that are raised stand out and are visible from the cab of the tractor, so as to notify that the safety latches are engaged. These flags can also alert the driver when the safety latches are not engaged by being down and less visible from the cab of the tractor. The invention is economical to manufacture and operate, and provides excellent cost benefits. Drivers really like it.

Numerous further advantages attend the invention.

DRAWINGS IN BRIEF

The drawings form part of the specification hereof. With respect to the drawings, which are not necessarily drawn to scale, the following is briefly noted:

FIG. 1 is a rear view of an embodiment of a pair of safety latches for a dump body mounted on a dump vehicle. Here, the safety latches are pneumatically operated. The dump vehicle is an end dump trailer. The safety latches are in their default, closed positions, in which the thrust pin in each safety latch is extended, which causes the signal flags to be raised up.

FIG. 2 is a perspective view of an active member of one of the safety latches employed in the combination of FIG. 1, with its thrust pin in the extended position, which would provide for a closed position of the safety latch when it is assembled with its corresponding passive member. The active member of the second safety latch is equivalent thereto.

FIG. 3 is a perspective view of part of the active member in FIG. 2, its thrust pin retracted so as to provide for an open position of the safety latch when assembled with its passive member.

FIG. 4 is a perspective view of an embodiment of pneumatically operated safety latches, two attached together as a pair for demonstration purposes, with the thrust pin of each extended in its default position, to provide for a closed position of each safety latch. These differ from the safety latch of FIGS. 2-3 primarily with respect to air-line routing and manual hold-open position override features.

FIG. 5 is a perspective view of part of one the safety latches of FIG. 4, in open position.

FIG. 6 is a perspective view of parts of the active member of the safety latch in FIG. 5.

FIG. 7 flow chart depiction of a way to make a catch such as found in FIGS. 4 and 5.

Figure 8:
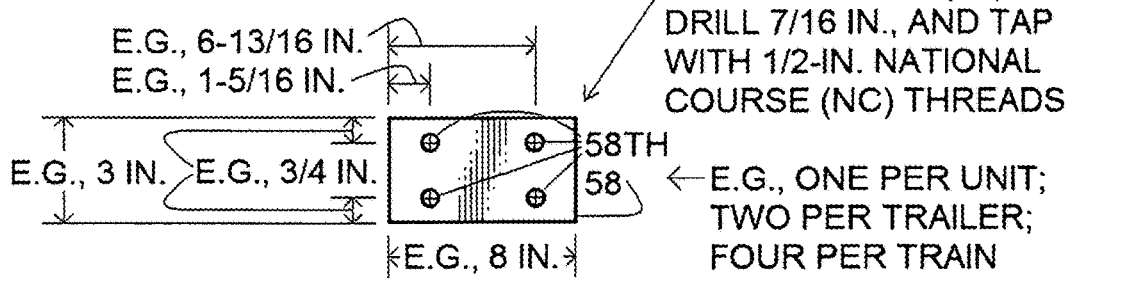

FIG. 8 is a side plan view of a spacer block, which may be welded to attach it to a dump body such as not made of steel, for example, made of aluminum, to secure the steel catch plate of FIG. 6 onto and spaced apart from stationary vertical structure of such a dump body, for example, as found in FIG. 1.

Figure 9:
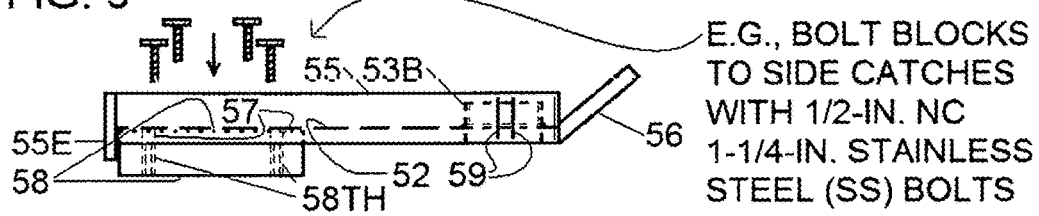

FIG. 9 is a top plan view of the catch of FIG. 6 being fixed to the spacer block of FIG. 8.

Figure 10:
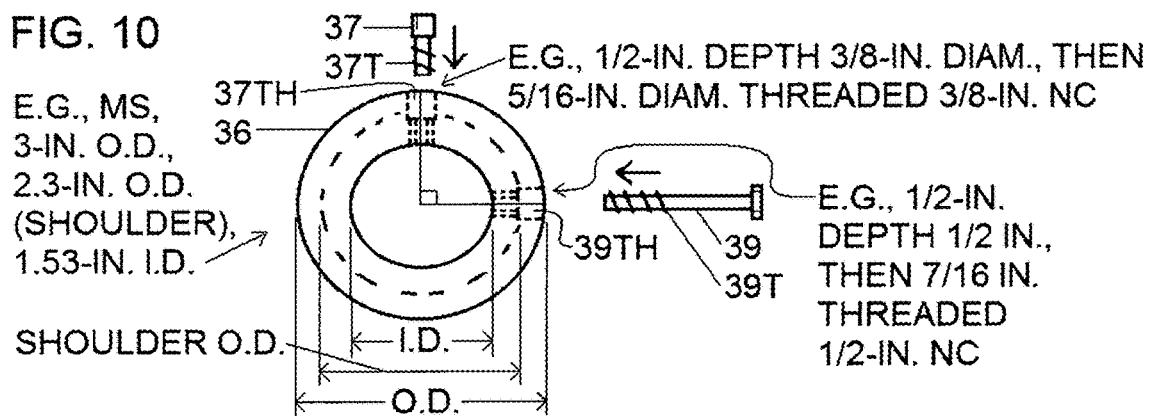

FIG. 10 is an elevational plan view of a shaft collar of a safety latch as of FIG. 2 or 4.

Figure 11:
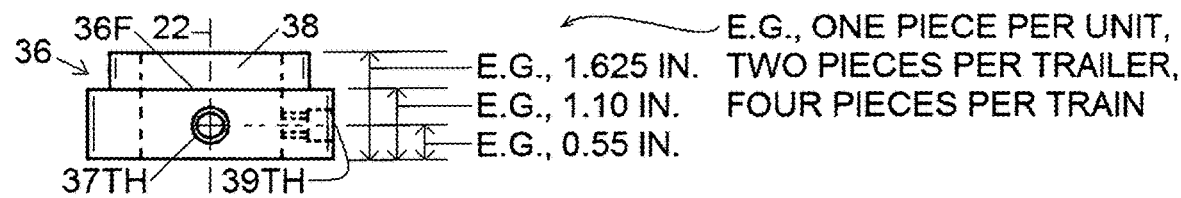

FIG. 11 is a top plan view of the shaft collar found in FIG. 10.

Figure 12:
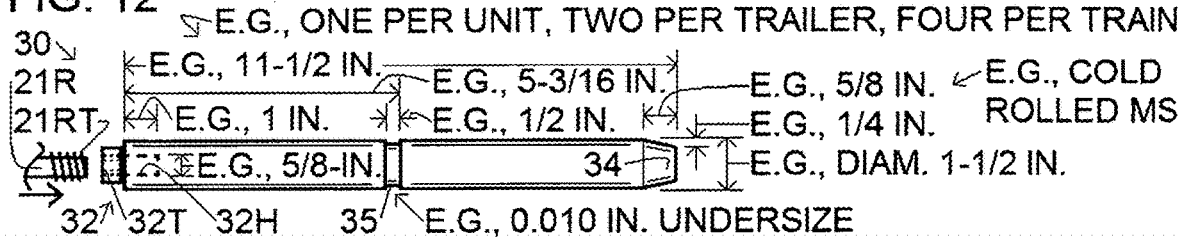

FIG. 12 is a plan view of a thrust pin, which may be called a lock shaft, found in a safety latch as of FIGS. 2-6 and 25-27.

FIG. 13 is a flow chart depiction of a way to make a support in a form of a housing for an active member such as of FIGS. 2 and 3.

FIG. 14 is a top, cut-away view of part of the housing from FIG. 13 focusing upon a pivoting override access opening. This may be a left hand (LH) component, designated as LH when it is viewed from the rear of the dump body. A corresponding right hand (RH) component can be a mirror image of the LH component.

FIG. 15 is a bottom view of the housing part of FIG. 14, in which a pivoting override access opening cover is included.

FIG. 16 is a side plan view of a signal flag for the safety latches in FIGS. 1, 4 and 5.

FIG. 17 is perspective view of a pair of covers, which may be found in FIG. 1, one of which stores a manual override lever tool.

FIG. 18 is a side view of a cover main body for a cover in FIGS. 1 and 17.

FIG. 19 is a rear view of the cover main body of FIG. 18.

FIG. 20 is an exploded plan view of a set of four covers for lead and following pup trailers in a train pulled by a truck tractor, before the covers are attached, say, by welding.

FIG. 21 is a side view of a right hand cover, say, for lead or pup trailers, as selected from the set in FIG. 20 and looking in an inboard to outboard direction, with its smaller side attached.

FIG. 22 is a side view of a right hand cover, say, for the lead trailer, looking in an outboard to inboard direction, with its larger side attached.

FIG. 23 is a side view of the manual override lever tool found in FIG. 17.

FIG. 24 is an exploded perspective view of a compression fitting that can be employed in a cover hereof so as to help store a manual override lever tool as in FIGS. 17 and 23.

FIG. 25 is a rear view of a safety latch as one of the safety latches in FIGS. 1, 4 and 5, in its closed position, with its signal flag pivoted "up" to show the same, say, to a driver.

FIG. 26 is a bottom view of part of the safety latch of FIG. 25 with the manual override lever tool of FIGS. 17 and 23 in place for manually opening the safety latch.

FIG. 27 is a rear view of a safety latch as one of the safety latches in FIGS. 1, 4 and 5, in its open position, with its signal flag pivoted "down" to show the same, say, to a driver.

Figure 28:
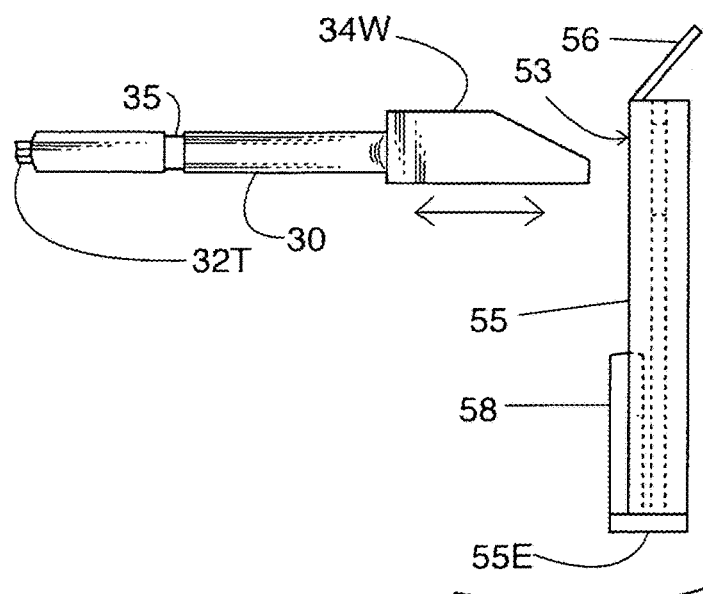

FIG. 28 is an exploded top view of parts of another embodiment of a safety latch hereof. It includes a wedge insertion end to its thrust pin and a corresponding receiving hole in its catch.

Figure 29:
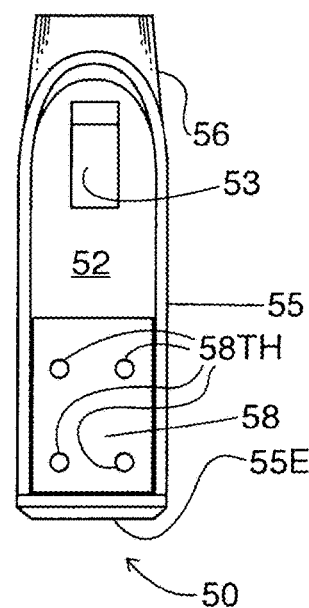

FIG. 29 is a side view of the catch found in FIG. 28.

Figure 30:
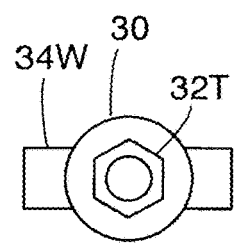

FIG. 30 is a proximate to distal end view of the thrust pin of the catch of FIG. 28.

Figure 31:
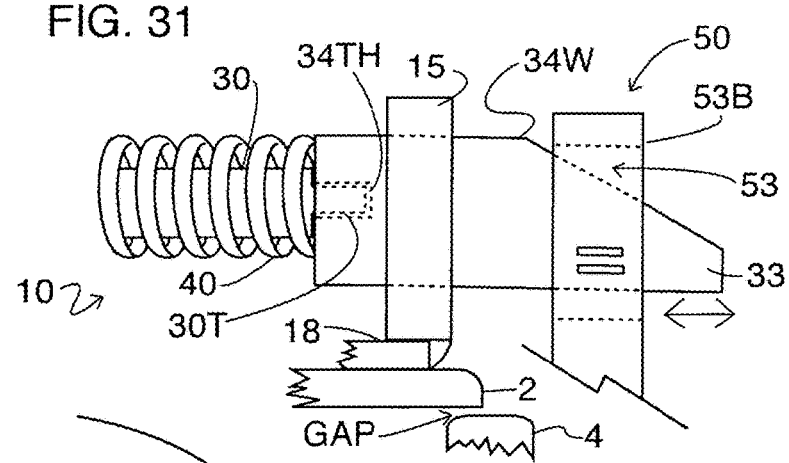

FIG. 31 is an embodiment of a safety latch attached to a dump body, with a wedge and rest of thrust pin threaded together. First and second elongate members are removed for clarity.

Figure 32:
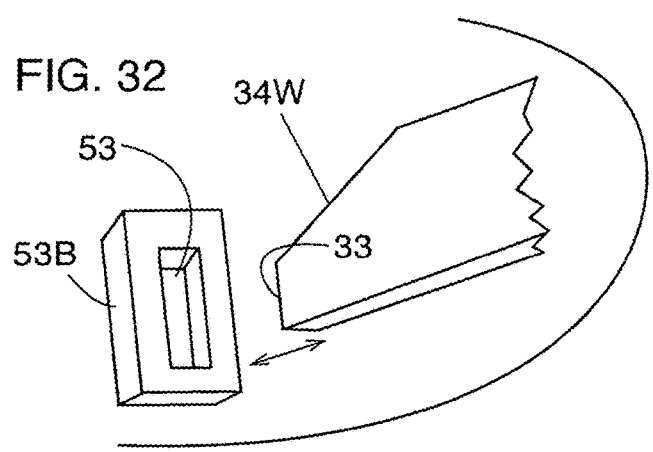

FIG. 32 is an exploded perspective view of a wedge as found in FIG. 28 or 31 for interaction with an insert bushing as found in FIG. 31.

Figure 33:
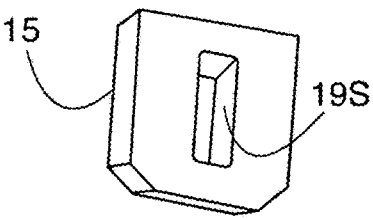

FIG. 33 is a perspective view of a second end for a support housing, which can accommodate a wedge end such as found in FIG. 28 or 31.

FURTHER ILLUSTRATIVE DETAIL

The invention can be further understood by the detail set forth below. As with the foregoing, the following, which also may be read in view of the drawings, is to be taken in an illustrative and not necessarily limiting sense.

With reference to the drawings, the present safety latch 100 is for mounting on dump body 1. The safety latch 100, which may be considered a secondary latch, i.e, a "secondary safety latch," includes active member 10 and passive member 50. The active and passive members 10, 50 may be provided separately or together assembled and/or mounted as on the dump body 1 or as a kit for assembly and mounting on the dump body 1 following receipt of the kit. Component parts may be made by known methods including machining and so forth.

The dump body 1 has dump gate 2, for example, with manual override lever tool end receiving holes 2H provided suitably therein, and bottom structure 3 for supporting and containing a LOAD above the bottom structure 3, with vertical structure 4 restraining and containing the LOAD laterally. A first portion of the vertical structure 4 would include, as the dump gate 2, an openable and closable dump gate pivotable about pivot 5, for example, at the top of the dump gate 2, and securable in a closed position by at least one primary latch 6, most often two, such as a pair of dog or hook type latches known in the art, for example, operated by fluid-activation, typically by pressurized air, which is spaced apart from the pivot 5, for example, as in an end dump trailer, opposing one another near the lowest and outermost parts of the dump gate 2. A second portion of the vertical structure 4 is able to be rendered stationary with respect to the dump gate 2, for example, being permanently configured as side and front walls of an end dump trailer. The dump gate 2, for example, designated the tailgate in an end dump body, is drawn into contact with adjacent side panel vertical structure 4 to close the dump body 1, for example, permanently secured side wall vertical structure at the rear of the dump body 1. The dump body 1 is able to be mounted on dump body supporting member 8, which can include a frame, wheels, and so forth, to provide dump vehicle 9. The dump vehicle 9 may be motive powered as in the case of dump trucks, or non-motive powered as in the case of dump trailers, for example, end dump trailers, which may be configured as lead and pup trailers in a train.

The active member 10 includes support 11. It also includes thrust pin actuator 20, thrust pin 30, and biasing element 40.

The support 11 may take any suitable form and be made of any suitable material(s), for example, in a form of housing 11' made of structural metal(s) such as aluminum and/or steel. The housing 11' provides channel 12 that is open for ready access for or to the thrust pin actuator 20, thrust pin 30, and biasing element 40 for assembly, or, after assembly, for manipulation, repair or replacement. In the channel 12 can be interior mount 13, say, of aluminum, with the channel 12 bounded by first end 14, say, of aluminum, and opposing second end 15, say, of aluminum. The channel 12 may be ordered with first space 14S and second space 15S, with the first space 14S going from the interior mount 13 to the first end 14, and the second space 15S going from the interior mount 13 to the second end 15. When the active member 10 is oriented for mounting or mounted on the dump body 1, first elongate member 16 may serve as a bottom portion of the housing 11'; second elongate member 17 may oppose the first elongate member 16 and serve as a top portion; and third elongate member 18 may reside between the first and second elongate members 16, 17 and serve as a base, which may face rearward so as to define a rear portion. The first and second elongate members 16, 17 may be considered to be legs, with the third elongate member 18 considered to be a face; and each of these members 16, 17, 18 may, for example, be of aluminum, and be joined from separate pieces or made, say, extruded, as one piece. The interior mount 13, first end 14, opposing second end 15, and first, second and third elongate members 16, 17, 18 are suitably assembled and joined such as by welding or another provision to make the housing 11'. Hole(s) 19 may be provided. For example, holes 19 may be provided to receive component or auxiliary parts or fasteners, or be threaded to receive threaded portions of bolts or screws; air hose hole 19A and manual override access opening 19B, say, in a form of a J- or L-shaped slot, an arm of which may be guarded by pivoting override access opening cover 19C, may be provided in the support 11 and housing 11'; slot 19S can be provided in the first end 14 for attachment of a fixed end of an air head cylinder actuator, for example, a substantially fluid-tight container 23, and/or in the second end 15 to accommodate a wedge end 34W; and a suitable hole 19 may be equipped with grease zerk 19Z. In general, the support 10 may be of any suitable size and shape. For example, when configured as the housing 11', it may be in a form of an elongate rectangular box, with an overall length about from twelve to twenty-eight to include sixteen to twenty-four inches, and an overall height and width about from two to five inches to include about from three to four inches. Thicknesses of the interior mount 13, first end 14, opposing second end 15, and first, second and third elongate members 16, 17, 18, for example, may be about from ⅛ of an inch to 1½ inches depending on materials selected and other components provided, for example, grease zerks 19Z, or not, with the interior mount 13, first end 14, and opposing second end 15 typically more thick, say, advantageously about from ½ of an inch to one inch, than the first, second and third elongate members 16, 17, 18, which may be, say, advantageously about from 3/16 of an inch to ⅜ of an inch.

The thrust pin actuator 20 is supported by and attachable to the support 11, and has movable thrust pin actuator element 21—which, in one embodiment of preferred fluid-actuated operation, can include piston 21P with piston rod 21R—and is able to be moved to and fro along axis 22 in which motion can ensue. The piston rod 21R may have tapered or preferably threaded distal end 21RT. Force for normal actuation of the thrust pin actuator 20 and operation of the active element 10 is applied non-manually. The thrust pin actuator 20 can be in a form of a thrust pin actuator assembly as in the one embodiment alluded to above, which can include the substantially fluid-tight container 23, which has hollow volume 24, and interior wall(s) 25 spaced apart from and substantially parallel to the axis 22; and the movable thrust pin actuator element 21 can be the piston 21P, which has lateral boundaries that conform closely to the interior wall(s) 25 such that, when the piston 21P is positioned in the hollow volume 24, the piston 21P is able to be slid to and fro along the direction of the axis 22 along which motion can ensue under influence of fluid as the non-manually applied force when the fluid is provided into or withdrawn from the hollow volume 24 at sufficient pressure to cause the piston 21P to slide. Actuation source conduit 29, for example, pressurized fluid line, say, pressurized air in a pneumatic system, provides the necessary power or force to actuate the thrust pin actuator 20. In addition to or in lieu of fluid-actuation and operation, actuation and operation may be provided by other means or devices, for instance, magnetic and/or electromagnetic force as, for example, from a solenoid that activates a movable thrust pin actuator element shaft; an electric motor, a fuel-powered engine, or fluid pressure to actuate a screw shaft constituting a movable thrust pin actuator element shaft, or a rack constituting a movable thrust pin actuator element shaft in combination with a pinion or worm gear; and so forth. Advantageously, the actuation force is provided from linear to and fro motion. Beneficially, the actuation and operation is pneumatic. As such, the thrust pin actuator 20 can be a commercial pneumatic piston-and-cylinder device such as a Model No. 703DPX pneumatic device from Bimba Mfg. Attachment to the support 11 or housing 11' can be by using the slot 19S in the first end 14 and a socket head cap screw.

The thrust pin 30, for example, of mild steel, may be one piece or in multiple pieces, for example, two, in which case connecting end 30T threaded, for example, with male threads. The thrust pin 30 has proximate end 31, which is attachable to the movable thrust pin actuator element 21 such that the thrust pin 30 is able to be moved to and fro in the direction of the axis 22 with movement of the movable thrust pin actuator element 21. Fixing feature 32, for example, centered, blind hole 31H such as from drilling may be provided in conjunction with threads 32T, for example, female threads, in and on the proximate end 31 so that the proximate end 31 of the thrust pin 30 can be fixed to a correspondingly threaded distal end 21RT on the piston rod 21R. The threads 32T may be provided by fixing, for instance, epoxy gluing or preferably welding, a nut with any from a number of thread sizes and pitches, for example, a National Standard Fine (NSF), say, a ¾-inch NSF, thread nut or, for example, a matching threaded, shaft-end-of-cylinder nut for highly secure coupling, to a proximate end 31 having the hole 32H. A bolt or rod may be used to align the nut and hole 32H before fixation. The thrust pin 30 also has distal end 33, which may have tapered extremity 34 or wedge 34W. The wedge 34W may be one piece with the rest of the thrust pin 30; be made from two or more pieces, say, two, thrust pin 30 portion with a wedge 34W, but attached by welding to make one integral item, which is preferred; or be attachable in a multi-piece thrust pin, for example, with threads, say, female threads, which mate with the threaded connecting end 30T. A wedge 34W may be made of any suitable material, for example, a mild steel, say, #A-36, which can provide for ready welding of pieces to one another. Recess 35 may be provided, which, for example, may be in a form of a shallow circumferential groove about a substantially cylindrical thrust pin such as the thrust pin 30, to position collar 36 having inner face 36F and receive set screw(s) 37 having threads 37T in threaded hole(s) 37TH to hold the collar 36 fast to the thrust pin 30. The collar 36 can be provided with shoulder 38. Manual opening shaft 39, for example, provided with threads 39T, may be fixed to the collar 36, for example, through fastening in threaded hole 39TH. The manual opening shaft 39, in conjunction with its operation in the override access opening 19B with its override access opening cover 19C flipped open to expose the holding portion of the override access opening 19B, can be used to open and hold the safety latch 100 open if there is a power failure. In general, the thrust pin 30 may be of any suitable size and configuration. For example, the thrust pin 30 may be in a form of elongate member, for the most part cylindrical, with a length about from eight to sixteen inches, a diameter about from one to two inches before any tapering, say, at the extremity of the distal end 33 or provision of any recess 35, say, roughly midway along its length. As well, the collar 36, for example, may be an annular member with an inside diameter or other shape to accommodate insertion of the thrust pin 30 and outside diameter or other shape about from two to four inches, and thickness suitable for providing the threaded hole(s) 37TH and/or 39TH, say, excluding an additional shoulder 38.

The biasing element 40 is any contrivance or device that can bias the thrust pin 30 in an extended position. The biasing element 40 can be a spring, for example, a compression spring, which may be stopped at one end by the interior mount 13 and at its opposing end by the collar 36 on the thrust pin 30 while having an end whereof residing on the collar shoulder 38, and have an about 75-lb. resistance per inch of travel, a resistance that can be overcome to move the thrust pin 30, for example, with an about 40-psi air load against a piston 21R having sufficient work surface area such as in the thrust pin actuator 20 exemplar introduced above.

In general, with the thrust pin actuator 20, thrust pin 30, and biasing element 40 included within the active element 10, one or more of the following may apply: at least part of the thrust pin actuator 20 assembly resides in the first space 14S of the housing 11'; the thrust pin 30 has sufficient length so as to reside at least in part in the second space 15S of the housing 11' and have its distal end 33 pass beyond the second end 15 of the housing 11'; and the biasing element 40 is attachable to the thrust pin 30 and the housing 11', and/or interior mount 13 to bias the thrust pin 30 in an extended position. For example, with a compression spring as the biasing element, the interior mount 13 can form a first restraining end, and the collar 36 can form a second restraining end. The collar 36 fixed to the thrust pin 30 may reside in the second space 15S. The biasing element 40 may be another type of spring such as extension and/or torsion spring(s), which may have one part attached to any convenient place on the support 11, which may be configured such as the housing 11', and another part attached to the thrust pin 30. When the thrust pin actuator is a piston-and-cylinder device as mentioned above including the piston 21P in the substantially fluid-tight container 23 with hollow volume 24, the biasing element 40, notably when embodied as a spring, may be positioned inside that container 23 within its hollow volume 24 on one side of the piston 21P and/or the other. For another example, biasing force from an extended biasing element 40 in a closed safety latch 100, particularly when a spring, engages the wedge 34W tighter in the passive member 50, with vibration, helping to close GAP between the dump gate 2 and stationary vertical structure 4, but the wedge shape provides for easy release. A biasing element 40 such as a compression spring may engage an inner face of a wedge 34W, in lieu of engagement with the corresponding inner face 36F of the collar 36.

Typically, the active member 10 is mounted to the dump gate 2 between the upper pivots 5 and primary latches 6, for example, roughly midway between them. The active member 10 may be attached to the dump gate 2 by welding the formed channel housing 11' to the gate 2, especially when the gate 2 and housing 11' are made of the same metal, for example, aluminum or steel, with the third elongate member 18 serving as the base and abutting the gate 2. Thus, the components 20, 30, 40 inside the housing 11' can be exposed or uncovered for service. In cases of dissimilar metals that cannot be welded easily, for example, steel and aluminum, a weldable spacer block made of an appropriate one of the metals and, say, having fastener holes, may be provided for welding and mechanically fastening the active member 10 akin to the case with passive member attachment as set forth below. Suitable mechanical fasteners alone may suffice.

The passive member 50 includes catch 51, which may be in a form of plate 52, for example, of steel, say, mild steel, having thrust pin receiving hole 53, which may be of any suitable size and shape, for example, cylindrical or in a form of a slot. When the active member 10 is assembled, and the movable thrust pin actuator element 21 is slid to and fro to move the thrust pin 30 to and fro, at least the distal end 33 of the thrust pin 30 penetrates into or is withdrawn from the thrust pin receiving hole 53 to close or open the safety latch 100. The thrust pin receiving hole 53, which may be provided from insertion into catch plate hole 53' a thrust pin receiving hole bushing 53B, may have inside bevel 54 on its thrust pin entry side for easier receipt of the thrust pin 30 with a tapered extremity 34. The plate 52 may have bracing 55, for example, of steel, say, mild steel, attached, say, about its periphery, which may be perpendicular, in general, to the plane of the plate 52. End bracing 55E, for example, of steel, say, mild steel, can be attached to an end of the plate 52 opposing the thrust pin receiving hole 53. Angled, striker plate ramp 56, for example, of steel, say, mild steel, can be attached to the catch 51, for example, near the thrust pin receiving hole 53, to force partial retraction of the thrust pin 30 sufficient to allow enough of the distal end 33 of the thrust pin 30 to be retracted and pass into to enter the thrust pin receiving hole 53 and allow for shutting and securing the dump gate 2 if the force necessary to retract the thrust pin 30 fails, for example, with failure of fluid pressure or other required power. The catch 51 can be provided with mounting holes 57 and/or mounting spacer block 58, for example, of aluminum, that may be provided with threaded holes 58TH to align with the mounting holes 57 and receive mounting bolts, and be welded at a suitable place to the second portion of the vertical structure 4 of the dump body 1 able to be rendered stationary with respect to the dump gate 2, for example, a permanently configured as side wall of the dump body 1. Signal mount receiving slot tabs 59 can be attached with alignment to the thrust pin receiving hole 53. Attachment of components of the passive member 59 can be by any suitable manner, for instance, welding, screwing, riveting and/or gluing. Welding is a preferred method. In general, the passive member 50 may be of any suitable size or configuration. For example, the passive member 50 may include a catch 51 in elongate form, with catch plate 52 about from twelve to twenty inches long, two to four or five inches high, and ⅛ of an inch to ⅜ of an inch in thickness. Any bracing 55, 55E, angled striker plate ramp 56 and/or spacer block 58 may account for extra length, height and/or thickness or width.

Signaling device 60, for example, a pivoting signal flag made of metal panel, beneficially is provided. Such a signaling device 60 may operate mechanically, based on motion and position of the distal end 33 of the thrust pin 30 in relation to the thrust pin receiving hole 53 of the passive member 50. An "up" or "down" position of such a signaling device amply provides a highly reliable, highly visible signal for the driver. For example, a locked or closed safety latch 100 can be signaled by an "up" position provided when the distal end 33 is extended through the thrust pin receiving hole 53 and pushes a lower portion of a flag outwardly to pivot a flag 60 upward, with an unlocked or open safety latch 100 signaled by the "down" position of a flag 60 pivoted back into its lower position by force of gravity when the distal end is retracted out of the thrust pin receiving hole and away from contact with the lower portion of the flag. The pivoting flags can have any suitable size and shape, and may be colored brightly, for example, with different sizes, shapes and/or colors for lead trailers than for following pup trailers, which can assist the driver in monitoring his equipment. For example, the signal flag 60 may be about from three to six inches laterally and perpendicular to lateral, with, as in the case of a train or a dump truck towing a trailer, a smaller flag for a lead trailer and a larger flag for a following pup trailer or the smaller flag for the truck and the larger flag for the trailer; and have a roughly planar, triangular shape with pivot receiving hole 61 near one corner, primary visual area 62 in a main portion, and have depending tooth 63 for contact with the tapered extremity 34 of the distal end 33 of the thrust rod 30 so that the flag 60 may be pivoted about a pivot received in the receiving hole 61; and be colored a bright yellow or orange for added left and right or possible front and rear identification. Left and right side signaling devices 60 may be provided.

Cover 70 can be provided. The cover 70 can include main body 71, first side 72, and second side 73, which can be made of suitable material(s) such as structural metal(s), for example, aluminum, say, 11-guage diamond-patterned aluminum plate. The main body 71 may be formed of one piece and bent or creased to provide a main body that is angled and have a cut out or trimmed portion near a top corner for contouring for a tight fit on a gate 2, and the first and second sides 72, 73 may be provided in triangular forms, for example, with the first side 72 larger than the second side 73. The first and second sides 72, 73 may be initially separate from the main body and attached subsequently, for example, by welding, so that the cover 70 can exclude debris effectively. Mounting holes 74 to accommodate attaching the cover 70 to the housing 11' with suitable fasteners such as bolts or screws may be provided in the main body 71. Side hole 75, for instance, about from ⅜ of an inch to ¾ of an inch in diameter, may be provided, say, in the first side 72, to provide for air-line entry. Tool hole 76, for instance about from ¾ of an inch to 1½ inches in diameter, may be provided also in the first side 72.

Manual override lever tool 80 may be provided. The manual override lever tool 80 may be in a form of a rod made with a suitable material such as a structural metal, for example, an elongate cylinder about from eighteen to thirty inches long by about from ½-inch to ¾-inch diameter aluminum, which may have circumferential end notch 81 defining end knob 82, which can be placed in the manual override lever tool end hole 2H to form a pivot while a spaced apart portion of the manual override lever tool is brought to bear against the manual opening shaft 39 to manually retract the thrust pin 30 against the force of the biasing element 40 into an open position, which may be secured in part of a J- or L-shaped the manual override access opening 19B. Manual override lever tool grip 83, for example, a compression fitting, say, an annular compression fitting such as a Truck-Lite ¾-inch compression fitting #50842 made from plastic, may be placed into the tool hole 76 for insertion and storage of the manual override lever tool 80. (A second manual override lever tool 80 may be stored elsewhere, for instance, in the cab of a dump truck or truck tractor for pulling dump trailer(s) equipped with the safety latch 100.)

The safety latch 100 can be attached to the dump body 8 having the dump gate 2 to provide dump body, safety latch combination 100'. The dump body, safety latch combination 100' can be attached to a dump body supporting member, which could include a frame, wheels, and so forth, to provide dump vehicle, safety latch combination 100".

The necessary power or force delivered through the actuation source conduit 29 to actuate the thrust pin actuator 20 and operate the safety latch 100 can be self-contained within a safety latch system or come from a source other than a dump vehicle 9 to which the safety latch 100 is attached. Advantageously, however, the necessary power of force is obtained from outside the safety latch system, for example, coming from a source already present on a dump vehicle 9 to which the safety latch 100 is attached, for example, from a pressurized fluid line, say, pressurized air in a pneumatic system, already present on or with the dump vehicle 9, into which the actuation source conduit 29 taps. An activation switch already existing on a frame of a dump vehicle 9, for example, may be employed. Activation switching may be moved to the cab of a tractor pulling a trailer or a truck equipped with the dump body 8 to make the same either a non-motorized or a motorized dump vehicle 9, respectively, with dump control in the cab.

To recapitulate, for example, air pressure to each of the two safety latches 100 operates each of their pneumatic cylinder thrust pin actuators 20, one left and the other right, which are secured to a swinging tailgate 2 that are usually extended and held in the extended position for latching or locking by a coil compression spring as the biasing element 40 delivering about seventy-five pounds per inch of travel. Pistons 21P as the movable thrust pin actuator elements 21 have sufficient surface area so that air pressure, say, at about forty pounds per square inch, can overcome the force of the biasing element 40. The air pressure introduced into the thrust pin actuators 20 retracts each piston 21P in its substantially fluid-tight container 23 having hollow volume 24, and cylindrical interior wall(s) 25, each piston connectable to a thrust pin 30, and compresses the coil compression spring biasing element 40 to retract the thrust pin so that its distal end 33 is pulled out sufficiently clear of the thrust pin receiving hole 53 of the catch 51 securely attached to exterior surfaces of nonmoving vertical sides 4 of the dump body 1 such as the sides of end dump trailers to unlatch or open the safety latch 100. This allows the tailgate 2 to open when the dump body 1 is pivotally raised so that the LOAD can be emptied. In the event that there is an air supply failure, the angled, striker plate ramps 56 are provided so that the actuator pin 30 can be withdrawn enough against the force of the biasing element 40 so that its distal end 33 can enter the thrust pin receiving hole 53 as the driver eases forward, sliding the tailgate 2 over the pile of emptied LOAD and slamming shut without debilitating metal-on-metal contact of an extended thrust pin 30 against a catch plate 52 or bracing 55.

CONCLUSION TO THE INVENTION

The present invention is thus provided. Various feature(s), part(s), step(s), subcombination(s) and/or combination(s) may be employed with or without reference to other feature(s), part(s), step(s), subcombination(s) and/or combination(s) in the practice of the invention, and numerous adaptations and modifications can be effected within its spirit, the literal claim scope of which is particularly pointed out as follows:

What is claimed is:

1. A combination comprising a secondary safety latch for a dump body having a dump gate; and the dump body having the dump gate, to which the secondary safety latch is attached, wherein:
    the secondary safety latch comprises the following assembled components (A, B):
    (A) an active member, which includes a support, and the following items (A', B', C', D'):
        (A') a thrust pin actuator, which has a movable thrust pin actuator element that is able to be moved to and fro along an axis in which motion can ensue through non-manually applied force;
        (B') a thrust pin having proximate and distal ends, with the proximate end attachable to the movable thrust pin actuator element such that the thrust pin is able to be moved to and fro along the axis in which the motion of the thrust pin actuator can ensue through non-manually applied force with movement of the movable thrust pin actuator element;
        (C') a biasing element to bias the thrust pin in an extended position; and
        (D') a manual opening shaft connectable to the thrust pin such that the thrust pin can be manually retracted to open the secondary safety latch; and
    (B) a passive member, which includes a catch having a thrust pin receiving hole such that—when the active member is assembled, and the movable thrust pin actuator element is slid to and fro—at least the distal end of the thrust pin can penetrate into or be withdrawn from the thrust pin receiving hole so as to close or open the secondary safety latch;
    the dump body having the dump gate has a bottom structure for supporting and containing a load above it; and vertical structure for restraining and containing the load laterally, a first portion of which includes the dump gate, which is pivotable about a pivot and securable in a closed position by at least one primary latch spaced apart from the pivot, and a second portion of which is able to be rendered stationary with respect to the dump gate; and
    the secondary safety latch attached to the dump body has its active member attached to the dump gate, and has its passive member attached to the portion of the vertical structure rendered stationary with respect to the dump gate.

2. The combination of claim 1, which is attached to a dump body supporting member, which has a frame and wheels, to provide a dump vehicle, which has the secondary safety latch attached to a dump body thereof.

3. A safety latch for a dump body having a dump gate, which comprises the following (A, B):
    (A) an active member, which includes a support, and the following (A', B', C'):
        (A') a thrust pin actuator, which has a movable thrust pin actuator element that is able to be moved to and fro along an axis in which motion can ensue through non-manually applied force;
        (B') a thrust pin having proximate and distal ends, with the proximate end attachable to the movable thrust pin actuator element such that the thrust pin is able to be moved to and fro along the axis in which the motion of the thrust pin actuator can ensue through non-manually applied force with movement of the movable thrust pin actuator element; and
        (C') a biasing element to bias the thrust pin in an extended position; and
    (B) a passive member, which includes a catch having a thrust pin receiving hole such that—when the active member is assembled, and the movable thrust pin actuator element is slid to and fro—at least the distal end of the thrust pin can penetrate into or be withdrawn from the thrust pin receiving hole so as to close or open the safety latch;
    wherein the support is in a form of a housing that provides a channel that is open for access for or to the thrust pin actuator, the thrust pin, and the biasing element for assembly, or, after assembly, for manipulation, repair or replacement; the thrust pin actuator is in a form of a thrust pin actuator assembly, which includes a substantially fluid-tight container having a hollow volume, at least one interior wall spaced apart from and substantially parallel to the axis in which the motion of the thrust pin actuator can ensue through non-manually applied force with movement of the moveable thrust pin actuator element, with the movable thrust pin actuator element including a piston, which has lateral boundaries that conform closely to the at least one interior wall such that, when the piston is positioned in the hollow volume, the piston can be slid to and fro along the direction of the axis in which the motion of the thrust pin actuator can ensue through non-manually applied force with movement of the moveable thrust pin actuator element, when, as the non-manually applied force a fluid is provided into or withdrawn from the hollow volume at sufficient pressure to cause the piston to slide; the thrust pin includes or is an elongate member in a form of a rod; and the biasing element includes or is a spring.

4. The safety latch of claim 3, which is pneumatically actuated.

5. The safety latch of claim 3, which is pneumatically actuated, and wherein the channel has an interior mount, and is bounded by a first end and an opposing second end such that the channel is ordered with a first space going from the interior mount to the first end, a second space going from the interior mount to the second end, and by first, second and third elongate members also such that, when the active member is oriented for mounting or mounted on the dump body, the first elongate member can serve as a bottom portion of the housing, the second elongate member opposes the first elongate member and can serve as a top portion of the housing, and the third elongate member resides between the first and second elongate members and can serve as a base that is oriented vertically.

6. The safety latch of claim 5, wherein the rod has a collar attachable thereto, and the spring rests against the collar.

7. The safety latch of claim 3, wherein a manual opening shaft connectable to the thrust pin is present such that the thrust pin can be manually retracted to open the safety latch.

8. The safety latch of claim 4, wherein a manual opening shaft connectable to the thrust pin is present such that the thrust pin can be manually retracted to open the safety latch.

9. The safety latch of claim 5, wherein the first elongate member has a manual override access opening; and a manual opening shaft connectable to the rod is present and passes through the manual override access opening such that the thrust pin can be manually retracted to open the safety latch.

10. The safety latch of claim 6, wherein the first elongate member has a manual override access opening; and a manual opening shaft connectable to the rod is present and passes through the manual override access opening such that the thrust pin can be manually retracted to open the safety latch.

11. The safety latch of claim 10, wherein the manual opening shaft connectable to the rod is connectable to the rod by being connectable through the collar.

12. A combination comprising a secondary safety latch for a dump body having a top-pivoting dump gate and a primary latch; and said dump body, to which the secondary safety latch is attached, wherein the secondary safety latch comprises the following components (A, B):
  (A) an active member, which includes a support, and the following (A', B', C'):
    (A') a thrust pin actuator, which has a movable thrust pin actuator element that is able to be moved to and fro along an axis in which motion can ensue through non-manually applied force;
    (B') a thrust pin having proximate and distal ends, with the proximate end attachable to the movable thrust pin actuator element such that the thrust pin is able to be moved to and fro along the axis in which the motion of the thrust pin actuator can ensue through non-manually applied force with movement of the movable thrust pin actuator element; and
    (C') a biasing element to bias the thrust pin in an extended position; and
  (B) a passive member, which includes a catch having a thrust pin receiving hole such that, when the active member is assembled and the movable thrust pin actuator element is slid to and fro, at least the distal end of the thrust pin can penetrate into or be withdrawn from the thrust pin receiving hole so as to close or open the secondary safety latch.

13. The combination of claim 12, wherein said dump body has a bottom structure for supporting and containing a load above it, and vertical structure for restraining and containing the load laterally, with a first portion of said vertical structure including the dump gate, which is pivotable about a top pivot and securable in a closed position by the primary latch spaced apart downwardly from the top pivot, and with a second portion of said vertical structure being stationary with respect to the dump gate; and the secondary safety latch is actuated by a fluid.

14. The combination of claim 13, wherein said dump body is attached to a dump body supporting member, which includes a frame and wheels, to provide to provide a dump vehicle top-pivoting dump gate, which has the secondary safety latch attached to the dump body thereof; and the secondary safety latch has its active member attached to the dump gate and its passive member attached to said second portion of said vertical structure.

15. The combination of claim 14, wherein the primary latch comprises a left side primary latch and a right side primary latch each located about a bottom of said gate and bottom of the dump body, to close said gate in the closed position; and the secondary safety latch comprises a left side secondary safety latch and a right side secondary safety latch, each spaced between the top pivot and the left and right side primary latches to secure the gate in the closed position, with the fluid being air.

16. The combination of claim 15, wherein the the axis in which the motion of the thrust pin actuator can ensue and the thrust pin actuator and thrust pin of each of the left and right side safety latches is horizontally directed.

17. The combination of claim 16, wherein the thrust pin is substantially cylindrical; the distal end of the thrust pin includes a bevel for penetration into and withdrawal from the thrust pin receiving hole; and the thrust pin receiving hole corresponds with the distal end of the thrust pin.

18. The combination of claim 16, wherein the distal end of the thrust pin includes a wedge for penetration into and withdrawal from the thrust pin receiving hole, with the wedge being under spring pressure; and the thrust pin receiving hole is in a form of a slot to receive to the wedge.

19. The combination of claim 18, wherein the thrust pin and wedge are made of distinct pieces attached one to another by at least one of welding and threading.

20. The combination of claim 12, wherein the support is in a form of a housing that provides a channel that is open for access for or to the thrust pin actuator, the thrust pin, and the biasing element for assembly, or, after assembly, for manipulation, repair or replacement; the thrust pin actuator is in a form of a thrust pin actuator assembly, which includes a substantially fluid-tight container having a hollow volume, at least one interior wall spaced apart from and substantially parallel to the axis in which the motion of the thrust pin actuator can ensue through non-manually applied force with movement of the moveable thrust pin actuator element, with the movable thrust pin actuator element including a piston, which has lateral boundaries that conform closely to the at least one interior wall such that, when the piston is positioned in the hollow volume, the piston can be slid to and fro along the direction of the axis in which the motion of the thrust pin actuator can ensue through non-manually applied force with movement of the moveable thrust pin actuator element, when, as the non-manually applied force, a fluid is provided into or withdrawn from the hollow volume at sufficient pressure to cause the piston to slide; the thrust pin includes or is an elongate member in a form of a rod; and the biasing element includes or is a spring.

21. The combination of claim 12, wherein the secondary safety latch includes a pivoting signal flag.

22. A safety latch for a dump body having a dump gate, which comprises the following (A, B):

(A) an active member, which includes a support, and the following (A', B', C'):
- (A') a thrust pin actuator, which has a movable thrust pin actuator element that is able to be moved to and fro along an axis in which motion can ensue through non-manually applied force;
- (B') a thrust pin having proximate and distal ends, with the proximate end attachable to the movable thrust pin actuator element such that the thrust pin is able to be moved to and fro along the axis in which the motion of the thrust pin actuator can ensue through non-manually applied force with movement of the movable thrust pin actuator element; and
- (C') a biasing element to bias the thrust pin in an extended position; and (B) a passive member, which includes a catch having a thrust pin receiving hole such that, when the active member is assembled and the movable thrust pin actuator element is slid to and fro, at least the distal end of the thrust pin can penetrate into or be withdrawn from the thrust pin receiving hole so as to close or open the safety latch.

\* \* \* \* \*